S. H. BUSHNELL.
Horse Hay-Rake.
No. 216,829. Patented June 24, 1879.
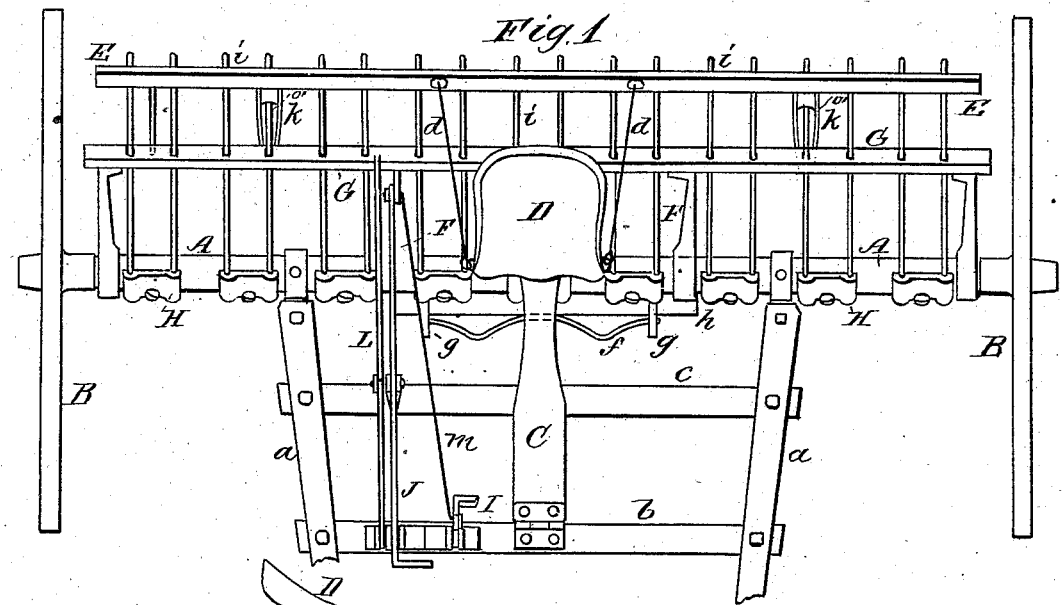
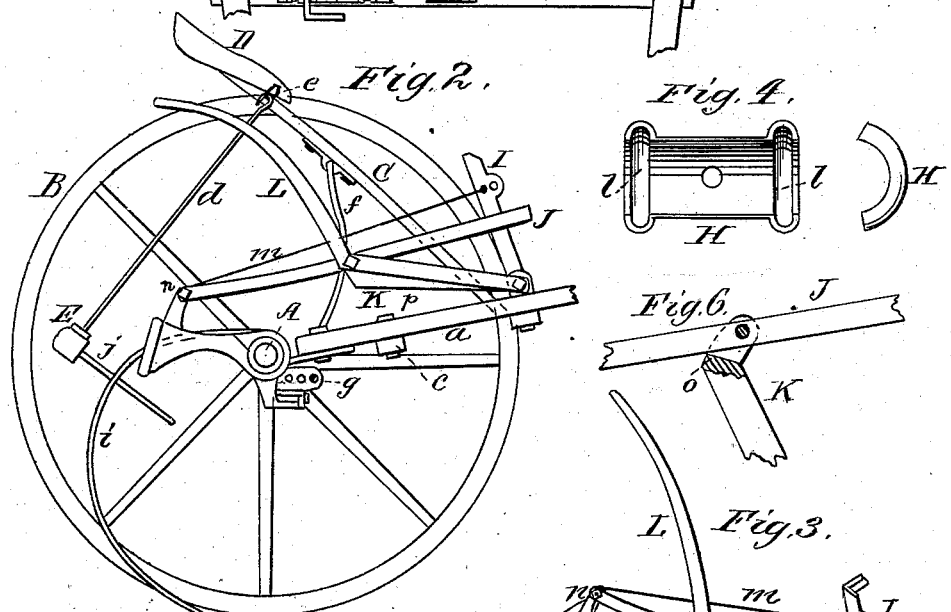
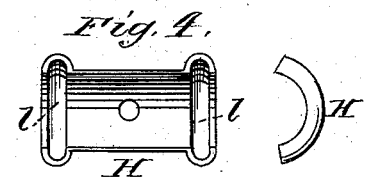
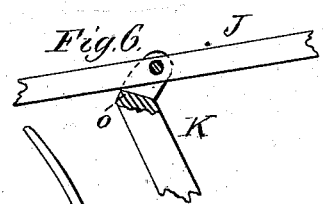
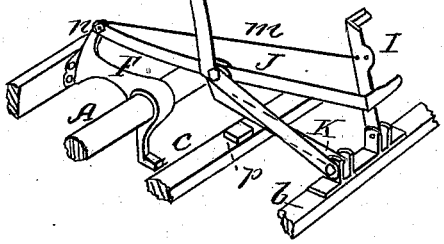
WITNESSES.
Geo R Porter
Nat E Oliphant
INVENTOR.
Solon H Bushnell,
per Chas H Fowler,
Attorney.

UNITED STATES PATENT OFFICE.

SOLON H. BUSHNELL, OF FAIRPORT, NEW YORK.

IMPROVEMENT IN HORSE HAY-RAKES.

Specification forming part of Letters Patent No. 216,829, dated June 24, 1879; application filed September 7, 1878.

*To all whom it may concern:*

Be it known that I, SOLON H. BUSHNELL, of Fairport, in the county of Monroe and State of New York, have invented a new and valuable Improvement in a Horse Hay and Grain Rake; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top-plan view of my invention. Fig. 2 is a side elevation. Fig. 3 is a detail view of the operating-levers; Fig. 4, a detached view, on an enlarged scale, of one of the plates used for securing the rake-teeth to the axle; Fig. 5, a detached view of one of the pointed staples; Fig. 6, a detail view of two of the operating-levers, showing their relative position at the point where they are pivoted together when the rake-teeth are elevated.

This invention has relation to sulky-rakes, wherein the teeth are raised to discharge the gathered load; and it consists in a novel arrangement of levers for operating the rake, as will be hereinafter more fully set forth, and pointed out in the claims.

In the accompanying drawings, A represents the axle or rake-head, carrying wheels B. To the axle is secured the draft-frame, consisting of the shafts $a$ and cross-bars $b$ $c$. To the cross-bar $b$ is hinged a seat-board, C, provided at its upper end with a suitable seat, D, for the driver.

The seat D is connected to a clearer-bar, E, by rods $d$, the upper ends hooking in rings $e$ secured to the seat. To the under side of the seat-board C is pivoted, hinged, or otherwise secured curved rods $f$, the lower ends being bent outward and engaging with one of a series of holes in plates $g$ secured to bar $h$ below the axle, by which means the driver's seat may be adjusted forward or back to increase or diminish the leverage according to the weight of the occupant. Brackets F F are secured around the axle A, near their center, and to the rear ends thereof is bolted a frame, G, which supports the teeth $i$ loosely in slots formed in the frame, and through which they rise and fall limitedly under the influence of occasional small obstacles upon the surface being raked. The brackets F F have an extension passing down under or below the axle A, for supporting the bar $h$. To the clearer-bar E are secured fingers $j$, which project downward between the rake-teeth, and serve to remove the gathered hay from the teeth when the latter are tilted or elevated.

Near each end of the clearer-bar E are staples $k$, secured thereto in any suitable manner, and at an angle corresponding to that of the fingers $j$. These staples $k$ are made solid a portion of their length at that point where they are joined to the clearer-bar, and terminate in a point at their lower ends.

The staples as constructed serve a double purpose—to hold the clearers in a direct line with the teeth and from swaying, and at the same time act as a clearer-finger to clear the hay from the teeth, the sharp point readily piercing the tangled hay and the gradual swell of the body of the staple assisting in separating it and clearing it from the teeth.

To provide a simple as well as practical means for securing the teeth $i$ to the rake-head or axle A, I construct a plate, H, the inner surface of which is concave to conform to the convexity of the axle A. Grooves $l$ are formed near its ends and upon its inner face for the reception of the ends of the teeth $i$ after they have been bent or hooked around the axle, as illustrated in Fig. 4, said plate being secured to the axle by a suitable bolt or screw.

It will be noticed that after the plates H are properly secured in place upon the axle and over the ends of the teeth the grooves in the plates give the teeth not only free vertical movement, but sufficient lateral play to allow them to readily yield to the sudden contact with any obstacles upon the ground, thereby preventing injury to the teeth, as well as providing a very simple and cheap means of attachment.

A foot-treadle, I, is hinged or pivoted to the bar $b$, and has connected to it a rod, $m$, one end of said rod passing through an extension, $n$, of the bracket F. The portion of the rod $m$ passing through the extension $n$ is screw-threaded, and has secured thereto by a suitable nut the rear end of a lever, J, said lever, near its middle, being pivoted to the rear end of a short lever, K, the forward end of lever K being pivoted to the cross-bar b. A hand-lever, L, is pivoted to the rear end of the lever K and to the bar b on the same horizontal plane as the lever K.

In describing the advantages of the several levers constructed and arranged as above described, it will be noticed that the pivotal point at which the rear end of the lever J is connected to the extension n of the bracket F is above the pivotal point at the middle of the lever, and the forward end of the lever J extends the entire length over the lever K. The center pivot being below the pivotal point at the rear end of the lever J and the manner with which the levers are combined form a lock, and when the teeth are raised to discharge the gathered load the lever J strikes a shoulder, o, between the bifurcated end of the lever K, limiting the upward movement of the rake-teeth, giving them a sudden jar and shaking off what loose hay may have adhered to the teeth.

When it is desired to discharge the load, a slight raising of the hand-lever L will disengage the lock of the levers, after which the rake will discharge by the weight of the operator upon the seat; and when found necessary, in addition thereto, the foot-treadle I may be brought into play to assist in elevating the rake.

The seat-board C, it will be noticed, is connected to the rocking axle A on a line below and in front of the same. Thereby the weight of the driver or operator upon the seat exerts more pressure at that point than any other requiring less weight to raise the teeth, and as the teeth are being elevated the foot-lever carries the teeth to the point desired. At the same time the bottom or lower ends of the braces or rods f are carried beyond the center of the axle A, relieving the foot from the lever, and the weight of the teeth react against the weight of the operator and immediately start back to a raking position, and as the foot-lever is coming down the foot is placed on it and is reset for another load.

Secured to the cross-bar c directly under the elbow of the hand-lever L, or at that point where said lever joins with the levers J K, is a large-headed set-screw, p, or other suitable device capable of vertical adjustment, so that by being raised to a sufficient distance the levers are thrown out of lock, and by lowering it it gives the levers a lower position in the center and forms a lock, by which means the rake can be used as a lock-lever rake, or otherwise, as found desirable.

Having now fully described my invention, what I claim as new, and desire to secure by Letters Patent, is—

1. The combination, with the lever K, formed at its rear end with shoulder o, of the lever J and hand-lever L, pivoted and constructed to operate together, as and for the purpose set forth.

2. The combination, with the levers J K L, pivoted together and arranged to operate as set forth, of the nut p, adjustable in the cross-bar c, and lying directly under the pivotal connection of the levers J K L, substantially as described, and for the purpose set forth.

3. The combination, with the lever K, having the shoulder o, of the lever J, hand-lever L, pivoted thereto, and set-nut p, substantially as described, and for the purpose set forth.

In testimony that I claim the above I have hereunto subscribed my name in the presence of two witnesses.

SOLON H. BUSHNELL.

Witnesses:
C. L. PEACOCK,
E. L. HODSKIN.